United States Patent [19]

Dupont

[11] 4,399,958
[45] Aug. 23, 1983

[54] TAPE LOOP POSITION DETECTOR

[75] Inventor: Jean Dupont, La Haye les Roses, France

[73] Assignee: Compagnie Internationale pour l'Informatique CII-Honeywell Bull, Paris, France

[21] Appl. No.: 271,573

[22] Filed: Aug. 8, 1981

[30] Foreign Application Priority Data

Jun. 19, 1980 [FR] France ............................. 80 13599

[51] Int. Cl.$^3$ ..................... G11B 15/58; G11B 23/12
[52] U.S. Cl. ................................................ 242/182
[58] Field of Search ............................ 242/182–185; 226/7, 95, 97; 360/71, 73

[56] References Cited

U.S. PATENT DOCUMENTS

| | | | |
|---|---|---|---|
| 2,952,415 | 9/1960 | Gilson | 242/184 |
| 3,122,332 | 2/1964 | Hughes, Jr. | 242/184 |
| 4,206,890 | 6/1980 | Barton, Jr. et al. | 242/184 |

*Primary Examiner*—Leonard D. Christian
*Attorney, Agent, or Firm*—Lowe, King, Price & Becker

[57] ABSTRACT

The position of a tape loop in a vacuum chamber is capacitively detected. The capacitive detector includes a flexible electrode that is deflected between a pair of walls parallel to a wall of a vacuum chamber in which the loop is formed by differential pressure in the chamber and by the pressure of a vacuum source having a pressure between the two pressures in the vacuum chamber. Between the flexible electrode and a stationary electrode is a fixed, solid dielectric. The wall includes plural apertures forming separate fluid flow paths. The vacuum source includes a partition with a plurality of apertures forming separate fluid flow paths. The apertures of the wall and partition are aligned and positioned in a direction between opposite ends of the vacuum chamber. The vacuum chamber wall is electrically grounded and an electrical insulator is positioned between an end of the flexible electrode adjacent the wall to maintain the flexible electrode electrically insulated from and a different potential from the grounded wall.

16 Claims, 8 Drawing Figures

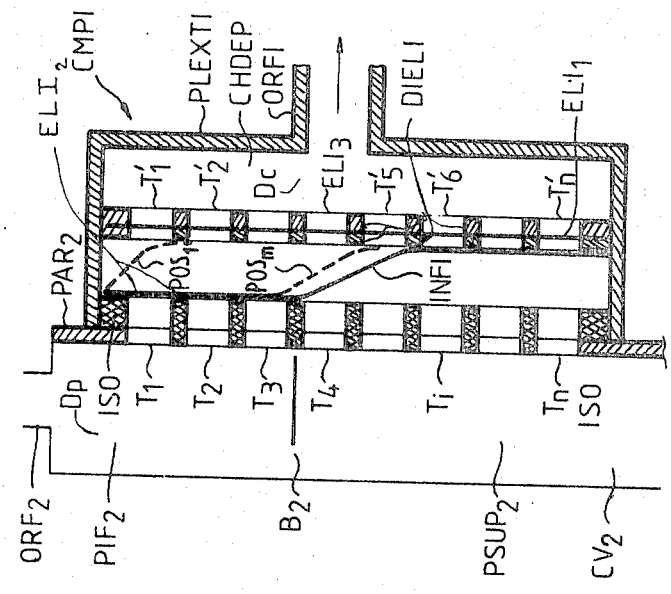
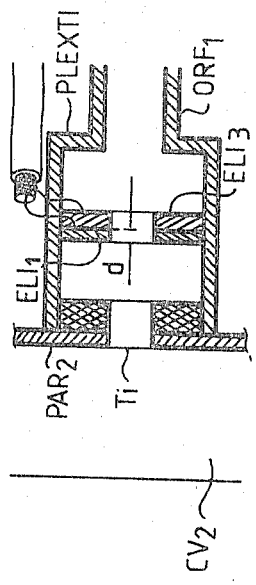
FIG.3a
FIG.3b
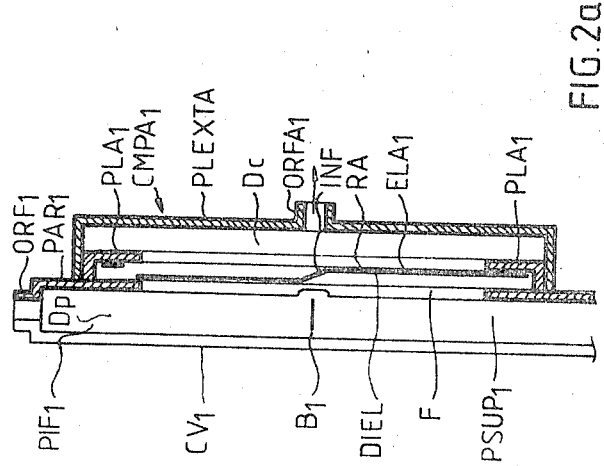
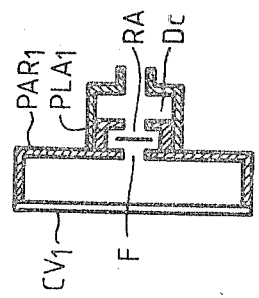
FIG.2a
FIG.2b

TAPE LOOP POSITION DETECTOR

TECHNICAL FIELD

The present invention relates generally to capacitive detectors for the position of a tape loop in a vacuum chamber, wherein the capacitive detector includes a flexible electrode that is variably deflected between a pair of walls having faces parallel to a wall of a vacuum chamber in which the loop is formed, so that the deflection is responsive to the position of the loop, as reflected by differential pressures in the chamber and the pressure of a vacuum source having a pressure between the pressures of the vacuum chamber. More particularly, the invention relates to such a detector including at least one of the following features: (1) a stationary, solid dielectric positioned between the flexible electrode and a fixed electrode; (2) separate, plural flow paths formed by a plurality of apertures in walls and the vacuum chamber and source; and (3) an electrical insulator between one end of the flexible electrode and the vacuum chamber wall for maintaining the flexible electrode electrically insulated from and at a different potential from the wall, which is a metal ground plane.

BACKGROUND ART

In existing data processing systems, magnetic tape is frequently utilized for storage of binary information because the tape has great storage capacity. The tape is wound on reels which are replaced when a read or write operation associated with data contained thereon is completed. The tape travels in an intermittent manner, in opposite directions, before an array of data read/write heads. The tape travels during a series of constant speed winding acceleration and deceleration intervals, with read/write operations being performed regardless of the tape travel direction.

Structures for winding such magnetic tape are well-known. One exemplary structure is disclosed in French Pat. No. 1,393,683, filed Mar. 25, 1964, by AMPEX Corporation with the title "Magnetic Tape Winding Device." The apparatus described in this patent includes first and second reels for carrying the tape, which reels may either be feed or takeup reels, in combination with two vacuum chambers for temporarily storing the tape, a single driving capstan positioned between the two chambers, and means for guiding the tape along a path between the reels, chambers and capstan. Each reel is equipped with a separate drive motor directly coupled to it.

The vacuum chambers have substantially constant cross-section and are connected to a vacuum source. The length of the vacuum chamber is much greater than the width thereof. In each vacuum chamber, the tape forms a loop that is positioned between one of the two reels and the capstan. The two reels are symmetrical with respect to the capstan, as well as the vacuum chambers.

Thus, each chamber includes a part situated between the tape loop and a closed wall thereof. This part of the chamber is referred to as the lower part of the chamber. Each chamber also includes a part that is situated between the loop and an open end of the chamber. The tape passes through the open end of the chamber, which is referred to as the upper part of the chamber. A vacuum source is connected in fluid flow relation with the lower part of the chamber. The pressure $P_i$ in the lower part of the chamber is lower than the pressure $P_s$ in the upper part of the chamber; generally the upper part of the chamber is at atmospheric pressure. As a result of this construction, it is possible to start and stop the tape in a period on the order of a few milliseconds.

To measure the displacement of the tape relative to the reels and heads, it is necessary to detect the position of the loop within each vacuum chamber at any instant. By determining the position of the tape loop in the vacuum chamber at any instant, the length of the portion of the tape present in the vacuum chamber is ascertained. To enable the position of the tape loop to be determined, each vacuum chamber includes a means for detecting the position of the tape loop contained therein. The tape loop position detector derives an electric, generally analog, signal having a magnitude that is a function of the tape loop position and therefore of the length of tape contained in the vacuum chamber. The electric signal is supplied to an electronic device for controlling a drive motor of a reel for the tape supplied to the vacuum chamber that includes the detector.

A detector of this general type is disclosed, for example, in French Pat. No. 1,362,356, filed July 9, 1963, by Nippon Electric Company, Ltd., with the title "Apparatus for Manipulating Tapes, For Example Recording Tapes." The structure disclosed in this patent includes a slot formed in an electrically grounded, metal wall of the chamber. The slot is positioned so that it is parallel to the length of the wall and to the tape surface in the chamber. To capacitively monitor the tape loop position, a moveable and deformable flexible strip made of a plastic, dielectric material, such as Mylar, coated by a thick metal sheet or foil is situated outside of the vacuum chamber. A part of the flexible, plastic strip faces the slot and may contact the slot and the wall containing the slot. In contrast, the metal coating on the strip does not contact the slot. The moveable and deformable flexible strip is biased by a vacuum source, having a pressure $P_c$ that is between $P_i$ and $P_s$.

Because of the slot, the relatively high vacuum established in the lower part of the vacuum chamber biases a first end of the flexible strip directly against a wall in the lower part of the vacuum chamber. In the upper part of the chamber, above the loop, where atmospheric pressure generally subsists, the vacuum source biases a second end of the flexible strip against a metal stop plate that is remote from and lies in a plane parallel to the chamber wall. This is because the pressure $P_c$ of the vacuum source is less than the generally atmospheric pressure $P_s$ in the upper part of the chamber. The chamber wall is a grounded metal wall, that forms a fixed electrode of a capacitor. The metal strip or foil on the flexible strip forms a moveable electrode of the capacitor. The plastic strip is located between the two electrodes and thus forms a dielectric of the capacitor. The capacitance between the electrodes is a function of an inflection or deflection region of the strip between the wall and the metal stop plate. The position of the strip inflection or deflection is in turn a function of the tape loop position, and therefore of the length of the magnetic tape portion contained in the vacuum chamber.

In current practice, the slot may be replaced by a series of holes situated along side each other in the same direction as the slot, i.e, parallel to the length of the vacuum chamber. Thus, the slot or series of holes forms a means for communicating between the vacuum chamber and an exterior environment.

Variations in the capacity of the capacitive detector, as a function of tape loop position in the vacuum chamber, are converted into analog electric signal variations. The analog signal is amplified by an electronic amplifying device associated with the detector to drive the motor, as stated supra.

A detector of the type described, while being easy to manufacture, has certain disadvantages. One of the disadvantages is that the thickness of the Mylar dielectric is usually quite small, whereby air penetrating through the slot in the upper section of the chamber causes the dielectric and the wall adjacent the dielectric to be soiled by several impurities, such as dust. Such soiling causes the thickness of the dielectric to vary as a function of time, to impair the detector accuracy. The moveable, flexible, thin electrode formed by a coating on the plastic strip also has a tendency to be deformed because of the suction exerted thereon by the relatively high negative pressure extant in the lower section of the vacuum chamber. Deformation of the flexible, thin electrode causes the edges of the electrode to be improperly in register with a wall of the vacuum chamber adjacent the slot. Thereby, leakage may result between the edges of the flexible electrode and the vacuum chamber wall adjacent the slot, to prevent deflection of the electrode at the tape loop position with a resulting inaccuracy of the detected capacitance.

DISCLOSURE OF THE INVENTION

The present invention is an improvement on the prior art capacitive detector; in the invention a stationary and non-deformable dielectric is provided adjacent a fixed electrode separated from the chamber wall. The variable capacitance is established by a flexible, metal plate electrode that is spaced from the fixed electrode, that is spaced from the wall. First and second opposite ends of the flexible electrode have faces respectively positioned in first and second planes substantially parallel to the wall. The face in the second plane is on the solid non-deformable dielectric that is positioned between the electrodes. The flexible electrode and vacuum source, having a pressure between the pressures in the vacuum chamber, are arranged so that the position of a transition of the flexible electrode from the wall to the dielectric region is dependent on the position of the loop in the chamber. Thereby, a portion of the flexible electrode between the pressures of the upper end of the chamber and of the vacuum source is urged by the higher pressure of the upper end against the dielectric region and a segment of the flexible electrode between the pressures of the lower end and the vacuum source is urged by the higher pressure of the vacuum source against the wall. The stationary and non-deformable electrode, in combination with a fixed electrode that is separate from the chamber wall, prevents substantial soiling and thereby assures relatively high accuracy of the detector. The accuracy of the detector remains constant over a relatively long time period. In addition, the flexible electrode, being formed of a metal plate, is more rigid than the prior art electrode formed of a metal coating on a plastic sheet. Thereby, the detector of the present invention is less liable to deterioration during assembly than the prior art structures.

In accordance with a further feature of the invention, the metallic wall is electrically grounded and an electrical insulator is located between one end of the flexible electrode and the wall. The electrical insulator maintains the flexible electrode electrically insulated from and at a different potential from the grounded wall. This feature enables both electrodes of the variable capacitor to be connected in a series circuit with terminals removed from ground potential.

In accordance with still a further feature of the invention, a metallic, grounded shielding ring is positioned in close proximity to the fixed electrode and on a side of the fixed electrode remote from the flexible electrode. The shielding ring isolates the fixed electrode from stray ground currents, i.e., from ground currents other than those associated with the vacuum chamber wall.

In accordance with still another feature of the invention, the chamber wall and a partition in the vacuum chamber include a plurality of apertures that form separate fluid flow paths. Preferably, the apertures of the wall and partition are aligned and arranged so that adjacent ones of the apertures are positioned in a direction between opposite ends of the vacuum chamber.

It is, accordingly, an object of the present invention to provide a new and improved capacitive detector for the position of a tape loop in a vacuum chamber.

Another object of the present invention is to provide a new and improved, more accurate and longer lasting capacitive detector for the position of a tape loop in a vacuum chamber.

Still another object of the present invention is to provide a new and improved capacitive detector for the position of a tape loop in a vacuum chamber, wherein the accuracy of the detector is not materially, adversely affected by dust or other soiling agents, and manufacture of the detector is facilitated compared to prior art devices.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIGS. 2a and 2b are respectively longitudinal and lateral cross-sectional views of a tape loop position detector according to the prior art, as described in the previously mentioned French Pat. No. 1,362,356;

FIGS. 3a and 3b are respectively longitudinal and lateral cross-sectional views of one embodiment of a tape loop position detector in accordance with the invention;

BEST MODE FOR CARRYING OUT THE INVENTION

Figure 1:
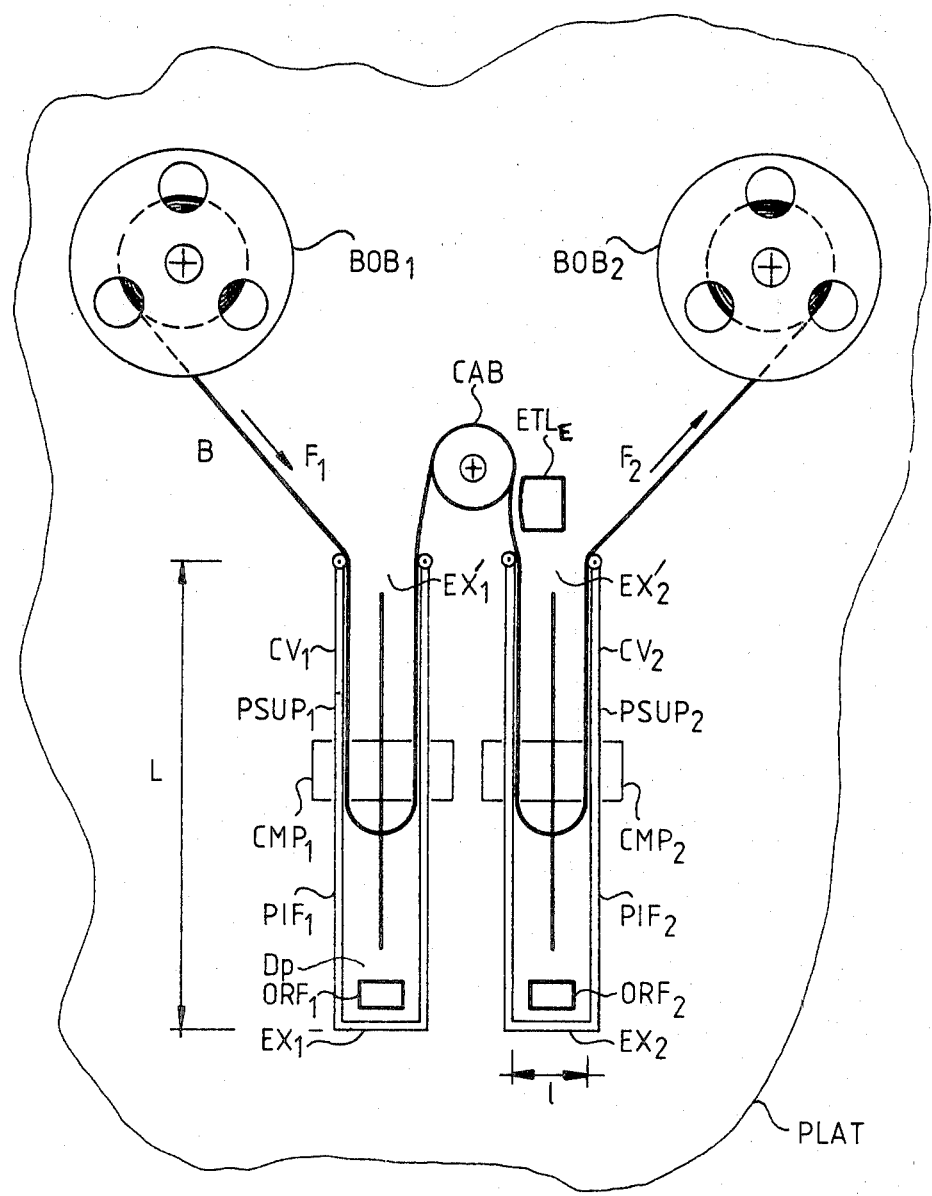
FIG. 1 is a simplified, somewhat schematic diagram of a tape winding mechanism of the prior art, and which is susceptible to use with the present invention.

Prior to describing the present invention, the construction and operating principles of a tape loop position detector in a magnetic tape winding system of the prior art are discussed in conjunction with FIGS. 1, 2a and 2b.

A prior art tape winding tape mechanism, as illustrated in FIG. 1, includes a pair of reels BOB$_1$ and BOB$_2$, each directly mechanically coupled to an electric motor (not shown), having a rotor with considerable inertia. The reels $BOB_1$ and $BOB_2$ driven by the motors are controlled by an electronic control device that is responsive, inter alia, to control signals indicative of the length of tape between reels $BOB_1$ and $BOB_2$. Tape B, paid between reels $BOB_1$ and $BOB_2$, traverses two vacuum chambers $CV_1$ and $CV_2$, having substantially constant cross-sections, and a length L that is considerably greater than the width 1 thereof. Vacuum chambers $CV_1$ and $CV_2$ respectively include orifices $ORF_1$ and $ORF_2$ that are connected in fluid flow relationship with a single vacuum source (not shown). Tape B is paid between chambers $CV_1$ and $CV_2$ by way of an electrically driven capstan CAB, that is able to turn in clockwise and counter-clockwise directions. Between capstan CAB and chamber $CV_2$ is located a set of magnetic read/write heads $ETL_E$. Tape B is driven in both directions relative to heads $ETL_E$ which magnetically read and write binary information on the tape. Within each of vacuum chambers $CV_1$ and $CV_2$ tape B forms a separate loop. The position of the loop of tape B in each of chambers $CV_1$ and $CV_2$ is respectively determined by capacitive measuring detectors $CMP_1$ and $CMP_2$.

If it is assumed that at a particular time instant tape B is paid from reel $BOB_1$ to reel $BOB_2$, whereby these reels are respectively the take-off and take-up reels, tape B travels in the direction indicated by arrows $F_1$ and $F_2$. The tape travel path between reels $BOB_1$ and $BOB_2$ is through vacuum chamber $CV_1$ to capstan CAB, across heads $ETL_E$ and through vacuum chamber $CV_2$.

Vacuum chamber $CV_1$ includes a closed end wall $EX_1$ and an opened end $EX'_1$ that is subjected to atmospheric pressure. Closed end $EX_1$ of chamber $CV_1$ defines an end wall of lower part $PIF_1$ of the chamber which is maintained at a relatively high vacuum $P_i$ by the vacuum source connected to orifice $ORF_1$, in proximity to wall $EX_1$. The vacuum is maintained in lower portion $PIF_1$ by virtue of a sealing effect established by tape B along side walls of the chamber in upper part $PSUP_1$ of the chamber. A similar relationship is established in vacuum chamber $CV_2$ in lower part $PIF_2$ and upper part $PSUP_2$ thereof because lower part $PIF_2$ is closed by end wall $EX_2$ and the upper part of the chamber is open to the atmosphere, by virtue of an open end $EX'_2$.

Detectors $CMP_1$ and $CMP_2$ in chambers $CV_1$ and $CV_2$ are the same. The prior art detector, disclosed in French Pat. No. 1,362,356, is illustrated in FIGS. 2a and 2b. It is to be noted that the chamber illustrated in FIG. 2 is shown in an upside down relationship, whereby the lower part $PIF_1$ of chamber $CV_1$ is above the upper part $PSUP_1$ of the chamber. The vacuum established in lower part $PIF_1$ of chamber $CV_1$ is indicated by $D_p$.

Chamber $CV_1$ includes a metal, usually grounded side wall $PAR_1$ coextensive with length L of the chamber. Wall $PAR_1$ includes an elongated slot F that is remote from orifice $ORF_1$. Slot F extends along the length of wall $PAR_1$ in a position where it is expected that loop $B_1$ of tape B is formed, i.e., the region in vacuum chamber $CV_1$ where the direction of movement of the tape has a transition from up to down, or vice versa.

The position of loop $B_1$ is capacitively determined by a detector including a moveable, flexible strip RA formed of a dielectric, plastic material, such as Mylar, that forms a dielectric DIL for the capacitor. Strip RA carries a metal layer or foil $ELA_1$ on the face thereof remote from wall $PAR_1$. Metal layer or foil $ELA_1$ is part of one electrode of the capacitive detector. The other electrode of the capacitive detector is formed by wall $PAR_1$. One end of dielectric strip RA is bonded to a segment of wall $PAR_1$ in proximity to an end of slot F closest to orifice $ORF_1$. Strip RA is secured to wall $PAR_1$ in such a manner that no electrical contact exists between foil $ELA_1$ and wall $PAR_1$ whereby the capacitance of the plastic dielectric subsists between the wall and foil. The other end of strip RA is bonded to metal stop plate $PLA_1$, so that foil $ELA_1$ is electrically connected to the stop plate. Leads (not shown) are connected to walls $PAR_1$ and $PLA_2$ to establish a variable capacitor having a value determined by the position of loop $B_1$ in vacuum chamber $CV_1$.

The structure including strip RA and stop plate $PLA_1$ is enclosed by an external plate PLEXTA, having a side wall generally prallel to and spaced from wall $PAR_1$. Plate PLEXTA includes side flanges that bear sealingly against wall $PAR_1$. The side wall of plate PLEXTA includes an orifice $ORFA_1$ that is connected to a vacuum source, having a pressure D, that is between the atmospheric pressure exerted on upper part $PSUP_1$ and lower part $PIF_1$ of chamber $CV_1$. Because of the sealing relationship of plate PLEXTA and the flanges thereof against wall $PAR_1$, the pressure $D_c$ is maintained within a chamber on the right side (as illustrated in FIGS. 2a and 2b) of strip RA. Strip RA thus defines an end wall of the chamber which lies generally parallel to plate PLEXTA. Thereby, two separate and distinct differential pressures are established across strip RA, above and below loop $B_1$. Below loop $B_1$, in lower portion $PIF_1$ of chamber $CV_1$, the differential pressure $(D_c - D_p)$ causes strip RA to be urged into a position that is generally parallel to and substantially aligned with wall $PAR_1$. Above loop $B_1$, the differential pressure $(P_s - D_c)$ causes strip RA to be urged against and substantially parallel to stop plate $PLA_1$. In proximity to loop $B_1$, tape RA includes an inflection or deflection point INF between the segments of the strip which are aligned with wall $PAR_1$ and plate $PLA_1$. As loop $B_1$ moves, the position of the differential pressure across strip RA varies, whereby the position of inflection point INF varies.

In response to variations in the position of inflection point INF, the capacitance between wall $PAR_1$ and plate $PLA_1$ varies because the positions of the moveable electrode $ELA_1$ and moveable dielectric DIEL vary relative to the fixed position of wall $PAR_1$. This prior art position detector has not been found to be sufficiently accurate in all situations and to have a relatively short life for reasons stated supra.

In accordance with the present invention, a capacitive detector of the type illustrated in FIGS. 2a and 2b is improved upon, as illustrated in FIGS. 3a and 3b. The detector of FIGS. 3a and 3b is associated with vacuum chamber $CV_2$ having lower and upper sections $PIF_2$ and $PSUP_2$, respectively subjected to vacuum pressure $D_p$ and atmospheric pressure $P_s$. Of course, in an actual situation the detectors in chambers $CV_1$ and $CV_2$ are identical. Tape B has a loop $B_2$ that is adjacent grounded, metal wall $PAR_2$ of chamber $CV_2$. Wall $PAR_2$ includes a plurality of aligned apertures $T_1, T_2 \ldots T_i \ldots T_n$, that extend in a direction parallel to the length of vacuum chamber $CV_2$, between closed end wall $EX_2$ and open end $EX'_2$ in the chamber. Apertures $T_1 \ldots T_n$ extend along the length of wall $PAR_2$ in a region where loop $B_2$ is expected to exist.

To detect the position of loop $B_2$, the detector of FIGS. 3a and 3b includes a stationary electrode $ELI_1$ formed of a metal plate, having a relatively narrow width, and positioned in a plane parallel to wall $PAR_2$, with an extent slightly greater than the distance separating opposite ends of apertures $T_1$ and $T_n$. Electrode $ELI_1$ carries stationary, solid dielectric DIELI that is positioned between the electrode and wall $PAR_2$. The capacitor forming the detector includes a moveable, flexible, metal strip or plate electrode $ELI_2$, having one end parallel to and secured in proximity to wall $PAR_2$ adjacent lower end $PIF_2$ of chamber $CV_2$ and a second end butting against dielectric $DIEL_1$, opposite from the upper end $PSUP_2$ of the vacuum chamber. In the preferred embodiment, metal electrode strip $ELI_2$ is electrically isolated from wall $PAR_2$, to prevent stray ground currents from being coupled to the electrode and to enable the electrode to be connected in a series circuit electrically isolated from ground. It is to be understood, however, that in another embodiment electrode $ELI_2$ can be connected directly to grounded wall $PAR_2$. In the preferred embodiment, wherein electrode $ELI_2$ is electrically isolated from wall $PAR_2$, so that the electrode is at a voltage different from the wall, the wall carries an electrical insulator ISO that defines the extremities for apertures $T_1 \ldots T_i \ldots T_n$. Dielectric DIELI that spaces electrodes $ELI_1$ and $ELI_2$ from each other is provided with a series of apertures $T'_1 \ldots T'_i \ldots T'_n$. Apertures $T'_1$ and $T_i$ are preferably aligned. Thus, insulator DILI basically carries electrode $ELI_1$.

Insulator DIELI also carries a metal, grounded shielding ring $ELI_3$ which shields electrodes $ELI_1$ and $ELI_2$ from stray ground path currents, i.e., ground path currents other than those which arise within primary grounded wall $PAR_2$ of chamber $CV_2$.

The position detector including electrodes $ELI_1$ and $ELI_2$, insulator ISO and dielectric DIELI is contained in a metal housing, including a wall PLEXTI that extends parallel to wall $PAR_2$. The housing containing wall PLEXTI includes flanges that are sealingly bonded to wall $PAR_2$ which are electrically insulated by insulator ISO and dielectric DIELI from electrodes $ELI_1$ and $ELI_2$. Thereby, a chamber CHDEP is established that contains electrodes $ELI_1$ and $ELI_2$ and dielectric DIELI, with one wall of the chamber being defined by flexible, metal electrode $ELI_2$. Chamber CHDEP is connected to a vacuum source by orifice ORFI in plate PLEXTI, to maintain the chamber at a pressure $D_c$. Pressure $D_c$ in chamber CHDEP is less than the atmospheric pressure on upper part $PSUP_2$ of chamber $CV_2$ but greater than the relatively high vacuum pressure $D_p$ in lower part $PIF_2$ of the chamber.

Solid dielectric DIELI, stationary electrode $ELI_1$ and shielding ring $ELI_3$ are preferably located on a single printed circuit board that contains apertures $T'_1 \ldots T'_n$.

The tape position detector of FIGS. 3a and 3b is responsive to the position of loop $B_2$ in such a manner that an inflection region INFI of electrode $ELI_2$ between the opposite ends of the electrode secured to insulators ISO and DIELI varies as the loop position varies. Thus, the portion of electrode $ELI_2$ which is located in front of holes $T_1$, $T_2$ and $T_3$ that are responsive to the pressure $D_p$ in the lower part $PIF_2$ of vacuum chamber $CV_2$ is biased against holes $T_1$, $T_2$ and $T_3$ in response to the higher pressure of $D_c$ than of $D_p$. The portion of electrode $ELI_2$ which is subjected to the differential pressure between upper portion $PSUP_2$ of chamber $CV_2$ and pressure $D_c$ in chamber CHDEP is urged against holes $T'_k$ which are above the position of loop $B_2$, where k is an integer greater than 3 and has a maximum value of n. In the specific embodiment illustrated in FIG. 3a, electrode $ELI_2$ contacts dielectric DIELI in the region of apertures $T'_6-T'_{n'}$ where n equals 8. There is thus an inflection region INFI between holes $T_3$ and $T'_6$. It is to be understood that the length of inflection region INFI is deliberately exaggerated in FIG. 3a and that in the usual situation two holes in wall $PAR_2$ and insulator DIELI are not spaced from the electrode, as illustrated in FIG. 3a. As the position of loop $B_2$ varies upwardly and downwardly in chamber $CV_2$ the position of inflection region INFI varies correspondingly between insulator ISO and dielectric DIELI. The variations in the position of inflection region INFI result in variations in the capacitance of a capacitor formed by electrodes $ELI_1$ and $ELI_2$ and dielectric DIELI. This variation in capacitance is converted into an analog signal by the apparatus described in connection in FIG. 5.

In response to loop $B_2$ being positioned at the extreme lower end of the range thereof, in proximity to the closed end wall $EX_2$ of vacuum chamber $CV_2$, and in alignment with aperture $T_1$ that is closest to orifice $ORF_2$, the capacitance of the capacitor formed by electrodes $ELI_1$ and $ELI_2$ has a maximum value, equal to $C_{max}$; in this situation, electrode $ELI_2$ has an inflection region INFI as indicated in FIG. 3a at position $POS_1$. In response to loop $B_2$ occupying a median position within vacuum chamber $CV_2$, electrode $ELI_2$ occupies a median position $POS_m$. In such a situation, if n equals 8, i.e., there are 8 apertures in insulator ISO and dielectric DIELI, electrode $ELI_2$ seals apertures $T_1-T_3$ and seals apertures $T'_5-T_n$. With loop $B_2$ in the median position, the capacitor has a capacitance of $C_{moy}$, equal to $0.5C_{max}$.

The loop position detector of FIGS. 3a and 3b has numerous advantages over the loop position detector of FIGS. 2a and 2b. In particular, soiling action caused by dust that is raised by air circulating between holes $T_i$ of wall $PAR_2$ has no effect on the accuracy of the measured capacitance because stationary electrode $ELI_1$ and a large part of moveable, flexible strip electrode $ELI_2$ are situated in a space having very limited air circulation. In addition, because solid dielectric DIELI remains stationary it has stable characteristics as a function of time. This is particularly important because dielectric DIELI is a measure of the capacitance between electrodes $ELI_1$ and $ELI_2$, and consequently the position of loop $B_2$. Because electrode $ELI_2$ is a plate, rather than a film or foil formed on a plastic strip, it is thicker than the prior art electrode. Thereby, the effect of dust on the dielectric is reduced in the detector of FIGS. 3a and 3b relative to the detector of FIGS. 2a and 2b. Because electrode $ELI_2$ is a metal strip, rather than a metallized layer on a plastic strip, as in the prior art, electrode $ELI_2$ is more rigid than the prior art strip RA. This is advantageous during installation of the detector, to assure satisfactory operation of the moveable electrode.

Figure 4B:
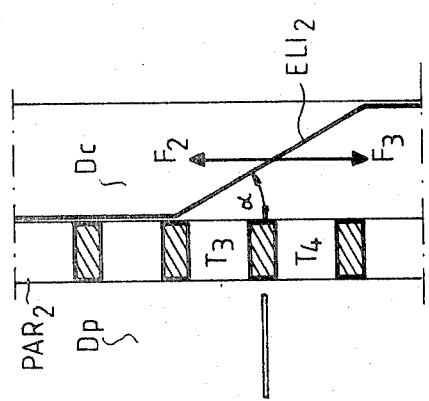
FIGS. 4a and 4b are drawings in which force vectors are illustrated for two different positions of the tape loop.
Figure 4A:
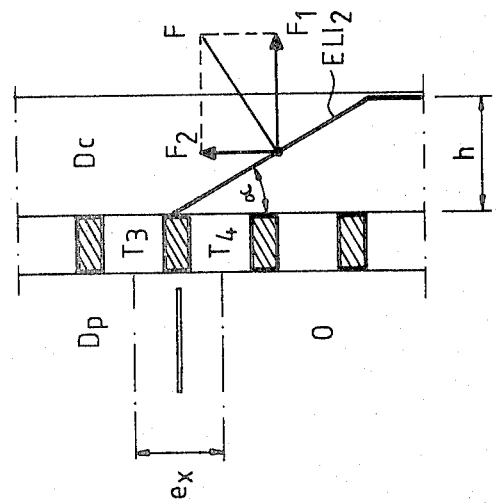

Reference is now made to FIGS. 4a and 4b which assist in making an analysis of the physical phenomena which occur as a result of the displacement of metal electrode strip $ELI_2$ of the detector of the present invention. Initially consider the situation illustrated in FIGS. 3a and 4a, wherein electrode $ELI_2$ seals apertures $T_1-T_3$ in insulator ISO. FIG. 4a enables a determination to be made of the apertures $T'_k-T'_n$ in insulator DIELI which are covered by the free end of electrode ELI$_2$. FIGS. 4a and 4b also enable an evaluation to be made of the inflection point of electrode ELI$_2$ relative to loop B$_2$.

Pressure D$_c$ in chamber CHDEP relative to the pressure in upper portion PSUP$_2$ of chamber CV$_2$ (assumed to be atmospheric) exerts a force F at right angles on inflection region INFI of strip ELI$_2$. It is assumed that strip electrode ELI$_2$ has a width L$_r$ and that the distance between the face of insulator ISO that electrode ELI$_2$ bears against and the part of the electrode bearing against dielectric DIELI is h. The total force thereby exerted by the differential pressure between upper portion PSUP$_2$ and the vacuum (D$_c$) in chamber CHDEP can thereby be rewritten as:

$$F = (h/\sin \alpha) \times 1_R \times D_c.$$

The force vector F can be resolved into a pair of right angle forces F$_2$ and F$_1$, respectively tending to displace electrode ELI$_2$ between insulator ISO and dielectric DIELI and in a direction parallel to wall PAR$_2$ and of the insulators. Aperture T$_3$ remains closed by electrode ELI$_2$ if F$_1$ is less than D$_p \times$S, where D$_p$ is the negative pressure in lower section PIF$_2$ of vacuum chamber CV$_2$, and S is the area of aperture T$_3$. Because $$F_1 = F \cos \alpha = (h/\sin \alpha) \times 1_R \times D_c \times \cos \alpha$$

$$F_1 = \cot \alpha \times 1_R \times h \times D_c; \text{ hence}$$

$$\cot \alpha \times 1_R \, h \times D_c < D_p \times S, \text{ or else}$$

$$D_c < D_p \, S/1_R \times h \times \cot \alpha.$$

In an actual embodiment of the invention, angle $\alpha$, the deflection angle of inflection region INFI of electrode ELI$_2$ is approximately 30 degrees. Angle $\alpha$ is a function of the stiffness of the metal in electrode ELI$_2$ and of the pressure D$_c$ in chamber CHDEP. In these circumstances, D$_c$ is generally a few percentage, on the order of eight percent, of D$_p$.

A lower limit for the separation h between the opposed faces of insulators ISO and DIELI can be established. In the portion of the detector close to solid dielectric DIELI that is not covered by electrode ELI$_2$, there is a parasitic capacitance which is formed between stationary electrode ELI$_1$ and ground. This parasitic capacitance has a dielectric formed by insulator DIELI. It can be shown that the parasitic capacitance for a value of h on the order of 4 millimeters is of the order of one percent of the maximum capacitance, C$_{max}$, of the position detector; one percent is considered to be a negligible value of the maximum capacity.

To enable electrode ELI$_2$ to be displaced between insulator ISO and dielectric DIELI, force F$_2$ which urges the deflected portion of electrode ELI$_2$ upwardly, must be opposed by a greater force F$_3$. Such a relationship is established if the average of the negative pressure is exerted on inflection region INFLI of electrode ELI$_2$ by the pressure in the upper section PSUP$_2$ of vacuum chamber CV$_2$ is greater than the pressure D$_c$ in chamber CHDEP. Because chamber CHDEP is maintained at a vacuum and the upper portion PSUP$_2$ of chamber CV$_2$ is at atmospheric pressure, such a force relationship follows. It can be shown that the displacement of electrode ELI$_2$ increases as the diameter of aperture T$_i$ decreases, as well as with decreases in the spacing e$_x$ of the axes of adjacent apertures T$_i$ and T$_{(i+1)}$, and of the angle $\alpha$. It can also be shown that the lengths of apertures T$_i$ in wall PAR$_2$ and insulator ISO should be relatively small.

Figure 5:
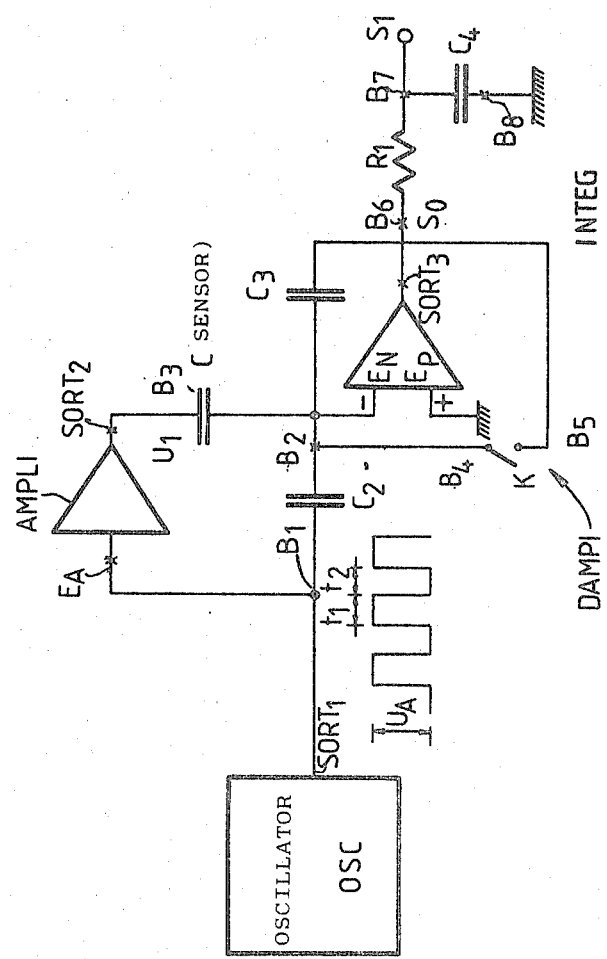
FIG. 5 is a schematic diagram of an electric circuit for deriving a signal indicative of the tape loop position detected by a capacitive detector in accordance with the invention.

Reference is now made to FIG. 5 of the drawing wherein there is schematically illustrated a circuit for converting the capacitance variations of the capacitive detector of FIGS. 3a and 3b into an electric analog signal having a value indicative of the position of loop B$_2$. The circuit of FIG. 5 includes a rectangular wave oscillator OSC that drives an inverting amplifier AMPLI, having an output terminal SORT$_2$ on which is derived a voltage U$_1$ that is applied to one electrode B$_3$ of variable capacitor C$_1$, that forms the position detector of FIGS. 3a and 3b. In parallel with the series combination of amplifier AMPLI and capacitor C$_1$ is capacitor C$_2$. A common terminal B$_2$ capacitors C$_1$ and C$_2$ is connected to inverting input terminal E$_N$ of integrator INTEG, having a feedback capacitor C$_3$. Integrator INTEG is periodically discharged, once during each cycle of the square wave output of oscillator OSC by closure of switch contact K. Integrator INTEG derives an output voltage that is coupled to a low pass filter including series resistor R$_1$ and a shunt capacitor C$_4$. A DC voltage is developed across capacitor C$_4$, connected between terminal S$_1$ and ground; the voltage across capacitor C$_4$ varies between positive and negative limits of $+V$ and $-V$, such that a zero voltage is derived at terminal S$_1$ in response to loop B$_2$ being at a median position within chamber CV$_2$ between the extreme ends of apertures T$_1$ and T$_n$. The voltage derived between terminal S$_1$ and ground is unaffected by possible dispersions in the characteristics of the tape loop position detector of the invention.

Oscillator OSC derives a periodic rectangular voltage having a minimum value of zero and a maximum value of U$_A$. The voltage value U$_A$ is maintained for an interval of t$_1$ while the zero value is sustained for an interval of t$_2$. Each cycle of the output of oscillator OSC thereby has a period of (t$_1$+t$_2$). Switch contact K between output terminal SORT$_3$ and input terminal E$_n$ of integrator INTEG, is closed during the leading edge transition of each pulse period t$_1$. While switch k is closed, any charge accumulated by integrator capacitor C$_3$ is discharged. During the second part, t$_2$, of each cycle of the rectangular wave derived by oscillator OSC, integrator INTEG derives an output voltage S$_O$ in accordance with:

$$S_O \times C_3 = -(U_A \times C_2 \times U_1 \times C_1) \quad (1)$$

For the median position POS$_m$ of electrode ELI$_2$, S$_O$ equals zero, whereby C$_1$=C$_{moy}$. Thereby, U$_A$C$_2$, the charge accumulated by capacitor C$_2$ during period t$_1$, equals the charge accumulated by capacitor C$_1$ during the same interval, whereby U$_A$C$_2$=$-$U$_1$C$_1$=U$_1$C$_{moy}$. Such a result can be achieved by forming amplifier AMPLI as an inverting amplifier whereby the current supplied to capacitor C$_1$ has a polarity opposite to the current supplied to capacitor C$_2$. Because $$C_{moy} = 0.5 \, C_{max}, \quad U_A C_2 = -0.5 \, U_1 \times C_1 \text{ max}. \quad (2)$$

Therefore, the gain of amplifier AMPLI, G, equals $$\frac{U_1}{U_A} = -\frac{C_2}{0.5 \, C_1 \text{ max}}, \quad G = -2C_2/C_1 \text{ max and } U_1 = G \times U_A;$$

therefore, $$S_0 \times C_3 = -(U_A \times C_2 + U_A G \cdot C_1) \text{ or} \qquad (3)$$

$$S_0 = \frac{-U_A(C_2 + G \times C_1)}{C_3}$$

The signal $S_O$ derived at the output terminal $SORT_3$ of integrator INTEG has a rectangular waveform. The rectangular waveform derived by integrator INTEG is integrated or filtered by the low pass filter including resistor $R_1$ and capacitor $C_4$ in such a manner that a continuous, DC voltage is derived at terminal $S_1$. The signal between terminals $S_1$ and ground can be represented as:

$$S_1 = S_O \times t_2/(t_1 + t_2) \qquad (4)$$

Equation (3) indicates that the output voltage, $S_O$, of integrator INTEG is not modified if capacitors $C_1$, $C_2$ and $C_3$ change in identical proportion. Therefore, capacitors $C_1$, $C_2$ and $C_3$ are mounted on a single support in the form of the printed circuit bearing dielectric DIELI and electrode $ELI_1$ and shielding ring $ELI_3$. By mounting all of the capacitors on the same printed circuit board as the board which carries electrode $ELI_1$ and ring $ELI_3$, it is possible to derive an analog output signal that is unaffected by manufacturing variations between different supports.

While there has been described and illustrated one specific embodiment of the invention, it will be clear that variations in the details of the embodiment specifically illustrated and described may be made without departing from the true spirit and scope of the invention as defined in the appended claims.

I claim:

1. Apparatus for detecting the position of a tape loop in a chamber, the tape being supplied to one end of the chamber, the other end of the chamber being maintained at a fluid pressure less than the one end and being closed by the tape in the chamber, a portion of the chamber where the loop is located including a wall for providing a fluid flow relation between the chamber and the detecting apparatus, the detecting apparatus being responsive to the location of a fluid pressure transition in the chamber resulting from the position of the loop and the fluid pressure difference on opposite sides of the loop, the detecting apparatus comprising a variable capacitor having fixed and flexible electrodes spaced from each other, the fixed electrode being spaced from and parallel to the wall, a stationary solid dielectric positioned between the electrodes, the stationary solid dielectric extending between the electrodes through substantially the same distance as the electrodes, a vacuum source for applying a fluid pressure to the flexible electrode between the pressures at the one and other ends of the chamber, first and second opposite ends of the flexible electrode having faces respectively positioned in first and second planes substantially parallel to the wall, the face in the second plane being on the stationary solid dielectric, the flexible electrode and vacuum source being arranged so that the position of a transition of the flexible electrode from the wall to the region is dependent on the position of the loop in the chamber, whereby a portion of the flexible electrode between the pressures of the one end and of the vacuum source is urged by the higher pressure of the one end against the stationary solid dielectric and a segment of the flexible electrode between the pressures of the other end and the vacuum source is urged by the higher pressure of the vacuum source against the wall.

2. The apparatus of claim 1 wherein the wall includes a plurality of apertures forming separate fluid flow paths, the vacuum source including a partition with a plurality of apertures forming separate fluid flow paths, the apertures positioned in a direction between the one and another ends of the chamber.

3. The apparatus of claim 1 or 2 wherein the wall is electrically grounded and the moveable electrode is electrically insulated from and at a different potential from the grounded wall.

4. The apparatus of claim 1 or 2 further including a grounded shielding ring positioned adjacent the fixed electrode and remote from the flexible electrode for preventing stray ground currents from being coupled to the electrodes.

5. The apparatus of claim 1 or 2 wherein the wall is electrically grounded and the moveable electrode is electrically insulated from and at a different potential from the grounded wall, and a shielding ring positioned adjacent the fixed electrode and remote from the flexible electrode for preventing stray ground currents from being coupled to the electrodes.

6. Apparatus for detecting the position of a tape loop in a chamber, the tape being supplied to one end of the chamber, the other end of the chamber being maintained at a fluid pressure less than the one end and being closed by the tape in the chamber, a portion of the chamber where the loop is located including a wall having a plurality of apertures forming separate fluid flow paths between the chamber and the detecting apparatus, the detecting apparatus being responsive to the location of a fluid pressure transition in the chamber resulting from the position of the loop and the fluid pressure difference on opposite sides of the loop, the detecting apparatus comprising a variable capacitor having fixed and flexible electrodes spaced from each other, the fixed electrode being spaced from the wall, the flexible electrode including a flexible strip consisting of metal, a dielectric region positioned between the electrodes, a vacuum source for applying a fluid pressure to the flexible electrode between the pressures at the one and other ends of the chamber, the vacuum source including a partition with a plurality of apertures forming separate fluid flow paths, first and second opposite ends of the flexible electrode having faces respectively positioned in first and second planes substantially parallel to the wall, the face of the flexible electrode in the second plane being on the partition, the flexible electrode and vacuum source being arranged so that the position of a transition of the flexible electrode from the wall to the partition is dependent on the position of the loop in the chamber, whereby a portion of the flexible electrode between the pressures of the one end and of the vacuum source is urged by the higher pressure of the one end against the partition and a segment of the other end and the vacuum source is urged by the higher pressure of the vacuum source against the wall.

7. The apparatus of claim 6 wherein the apertures of the wall and partition are aligned.

8. The apparatus of claim 6 or 7 wherein adjacent ones of the apertures are positioned in a direction between the one and an other ends of the chamber.

9. The apparatus of claim 6 or 7 wherein the dielectric region is a stationary solid.

10. The apparatus of claim 6 or 7 wherein the dielectric region is a stationary solid mounted on a printed circuit board carrying the stationary electrode.

11. The apparatus of claim 6 or 7 wherein the wall is electrically grounded and the moveable electrode is electrically insulated from and at a different potential from the grounded wall.

12. The apparatus of claim 11 further including a grounded shielding ring positioned adjacent the fixed electrode and remote from the flexible electrode for preventing stray ground currents from being coupled to the electrodes.

13. Apparatus for detecting the position of a tape loop in a chamber, the tape being supplied to one end of the chamber, the other end of the chamber being maintained at a fluid pressure less than the one end and being closed by the tape in the chamber, a portion of the chamber where the loop is located including an electrically grounded wall for providing a fluid flow relation between the chamber and the detecting apparatus, the detecting apparatus being responsive to the location of a fluid pressure transition in the chamber resulting from the position of the loop and the fluid pressure difference on opposite sides of the loop, the detecting apparatus comprising a variable capacitor having fixed and flexible electrodes spaced from each other, the fixed electrode being spaced from the wall, a stationary solid dielectric positioned between the electrodes, a vacuum source for applying a fluid pressure to the flexible electrode between the pressures at the one and other ends of the chamber, first and second opposite ends of the flexible electrode having faces respectively positioned in first and second planes substantially parallel to the wall, the face in the second plane being on the dielectric, an electrical insulator between the first end and the wall for maintaining the flexible electrode electrically insulated from and at a different potential from the grounded wall, the flexible electrode and vacuum source being arranged so that the position of a transition of the flexible electrode from the wall to the region is dependent on the position of the loop in the chamber, whereby a portion of the flexible electrode between the pressures of the one end and of the vacuum source is urged by the higher pressure of the one end against the region and a segment of the flexible electrode between the pressures of the other end and the vacuum source is urged by the higher pressure of the vacuum source against the wall.

14. The apparatus of claim 13 further including a grounded shielding ring positioned adjacent the fixed electrode and remote from the flexible electrode for preventing stray ground currents from being coupled to the electrodes.

15. The apparatus of claim 1, 2, 6, 7 or 13 wherein the variable capacitor is connected in an electric circuit for deriving an output signal having an amplitude commensurate with the position of the loop, said circuit including an a.c. source for supplying opposite polarity current pulses to the variable capacitor and a second capacitor, a rectifier including an integrating capacitor responsive to the sum of the currents flowing in the variable and second capacitors, for deriving a bi-polarity d.c. signal commensurate with the position of the loop, the d.c. signal having a zero value in response to the loop being centrally positioned relative to the wall, as well as positive and negative values in response to the loop being respectively positioned on first and second opposite sides of the central position.

16. The apparatus of claim 1 wherein the flexible electrode includes a flexible strip consisting of metal.

* * * * *

UNITED STATES PATENT OFFICE
CERTIFICATE OF CORRECTION

Patent No. 4,399,958   Dated  August 23, 1983

Inventor(s)  Jean DUPONT

It is certified that error appears in the above-identified patent and that said Letters Patent are hereby corrected as shown below:

Cover page, item [22], (filing date), please change "August 8, 1981" to --June 8, 1981--.

Signed and Sealed this

Eighteenth Day of October 1983

[SEAL]

Attest:

GERALD J. MOSSINGHOFF

Attesting Officer    Commissioner of Patents and Trademarks